United States Patent [19]

Popat et al.

[11] Patent Number: 5,564,114
[45] Date of Patent: Oct. 8, 1996

[54] METHOD AND AN ARRANGEMENT FOR HANDSHAKING ON A BUS TO TRANSFER INFORMATION BETWEEN DEVICES IN A COMPUTER SYSTEM

[75] Inventors: Kaushik L. Popat, Pleasanton; Fukuji Sugie, San Jose, both of Calif.

[73] Assignee: Cirrus Logic Inc., Fremont, Calif.

[21] Appl. No.: 369,968

[22] Filed: Jan. 9, 1995

[51] Int. Cl.⁶ .................................................. G06F 13/00
[52] U.S. Cl. ........................... 395/285; 395/280; 395/290
[58] Field of Search ................................... 395/285, 290, 395/280

[56] References Cited

U.S. PATENT DOCUMENTS

| | | | |
|---|---|---|---|
| 4,162,541 | 7/1979 | Hartke | 365/230 |
| 4,785,394 | 11/1988 | Fischer | 364/200 |
| 5,436,621 | 7/1995 | Macko et al. | 340/825.44 |
| 5,448,703 | 9/1995 | Amini et al. | 395/290 |

Primary Examiner—Jack B. Harvey
Assistant Examiner—John Travis
Attorney, Agent, or Firm—Lowe, Price, LeBlanc & Becker

[57] ABSTRACT

A computer system is provided with a central processing unit (CPU), a bus master coupled to the CPU, and a plurality of interface cards that interface the computer system with peripheral devices. A plurality of host adapters are coupled between the bus master and the interface cards. The host adapters adapt signals between the CPU and the interface cards. Each host adapter generates a ready signal that when asserted indicates readiness of the host adapter to receive address information from the bus master and have data information read by the bus master. An address/data bus is coupled between the bus master and the host adapters. A single separate ready line is coupled between each of the host adapters and the bus master, each ready line carrying the ready signal from a different one of the host adapters to the bus master. The single ready signal carried by a single line serves both an address ready and a data ready signalling function, to thereby, reduce the pin count in the host adapter serving as a slave.

24 Claims, 4 Drawing Sheets

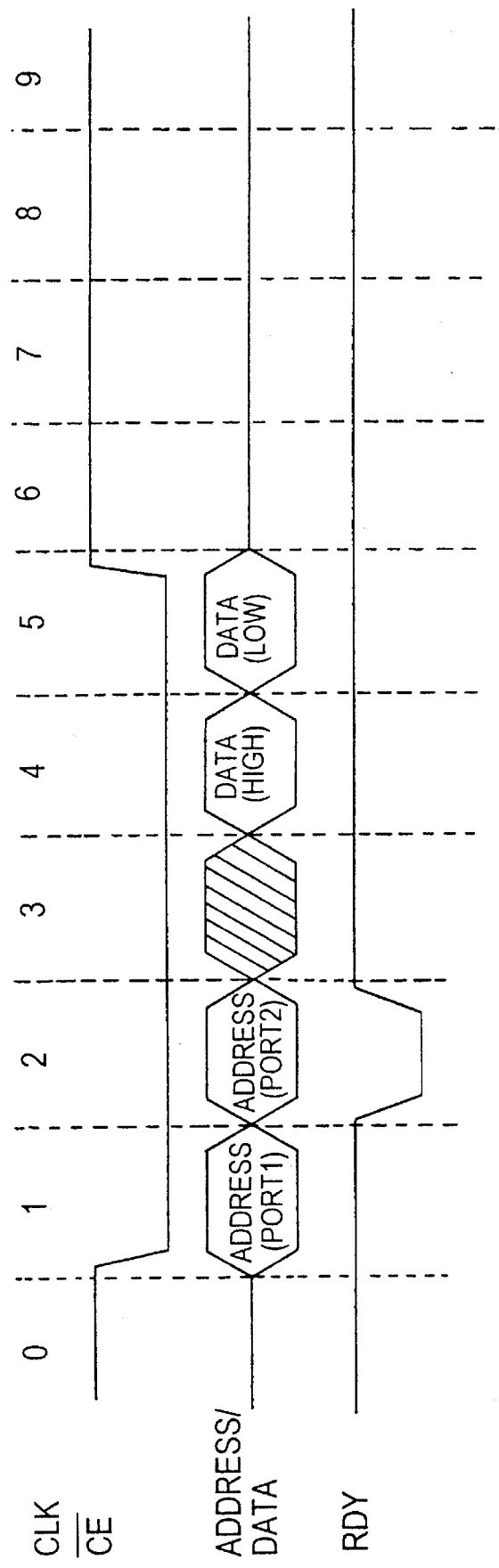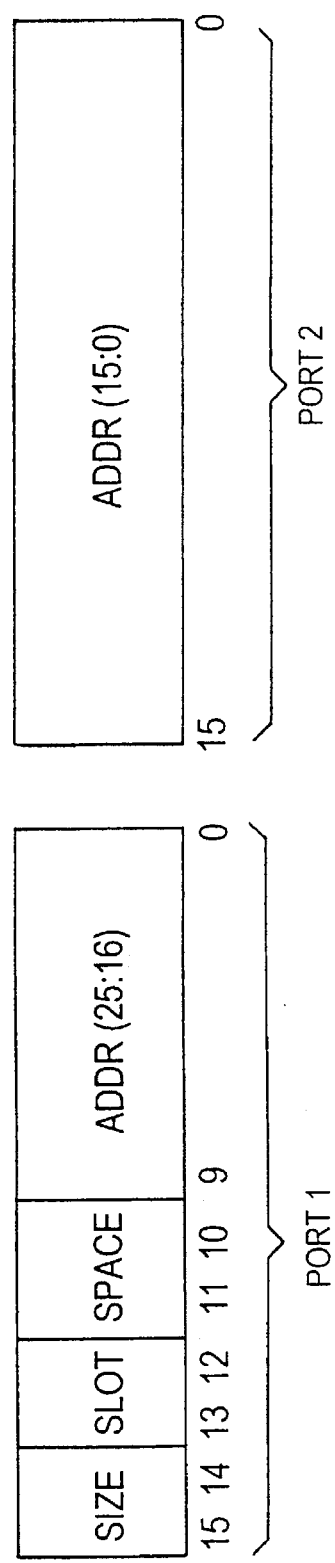
FIG. 5
FIG. 6

5,564,114

METHOD AND AN ARRANGEMENT FOR HANDSHAKING ON A BUS TO TRANSFER INFORMATION BETWEEN DEVICES IN A COMPUTER SYSTEM

BACKGROUND OF THE INVENTION

1. Technical Field of the Invention

The present invention relates to the field of computer systems, and more particularly, to systems having master and slave devices with a protocol for establishing communications between the master and slave devices.

2. Description of Related Art

Most modern computer systems include a number of different devices that communicate with one another over a bus. Each device can be separately connected to the bus, which is essentially a common set of conductive lines over which signals are carried to all of the devices connected to the bus. The information that is typically carried by buses includes addresses and data, although these are often carried separately on an address bus and a data bus. Other buses, such as the peripheral component interface (PCI) bus, carry the address information and the data information in a time multiplexed format, with distinct address and data phases on the bus. The data phase follows the address phase in typical transfers, either directly following the address phase, or at some time period after the address phase (a "split transaction"). The bus concept provides system expandability since a new device can be added to the computer system by connecting the new device to the bus where it can communicate with the existing devices on the bus.

Certain types of devices that are coupled to the bus can operate as "master" devices that take over control of the bus, at least temporarily, to initiate transactions with other devices coupled to the bus. An example of a master device is a central processing unit (CPU). Other types of devices coupled to the bus, such as a hard disk drive or host adapters for interface cards, operate as "slave" (or "target") devices. In general, slave devices are responsive to the requests of master devices to perform specified actions, such as a transfer of data with the master. Many devices can function as both a master and a slave.

Masters and slaves normally execute some type of protocol to establish communications between a particular master and a particular slave with which the master desires to effect a transaction. One type of protocol is a "handshake" protocol, in which the master sends a signal that informs the particular slave that the master wants to perform a transaction with that slave. In response to the master's signal, the slave asserts a signal generally indicating its readiness to perform the transaction. In certain systems, the slave will assert a plurality of different handshake signals. For example, in many systems a slave will assert an address ready signal to indicate to a master that it is available to receive address information, and a data ready signal that indicates that the slave has ready data information to be read by the master.

In a known system that uses a bus on which addresses and data are multiplexed, in addition to the bus connections, each of the slaves is coupled to a master device by separate address ready and data ready lines. Each slave therefore has one output connection for the address ready signal, and another output connection for the data ready signal. Separate address ready input connections at the master for each of the slaves are required since the master needs to distinguish between the address ready signals of the different slaves coupled to the master. Each of the address ready output connections from the different slaves therefore forms a separate address ready input connection to the master. By contrast, the data ready output connections from a plurality of slaves can be connected together to form one data ready input to the bus master, since only the addressed slave will assert the data ready signal when it is ready to transfer data.

A design consideration for many devices is the "pin count" of the chip that forms the device. The pin count is the number of connection pins that connect the chip (i.e. the device) to a bus or other signal lines. A reduction in the pin count of a chip, even by one pin, can have a significant positive impact in minimizing the cost of the chip.

SUMMARY OF THE INVENTION

There is a need for a method and a system that allow a slave device with a reduced pin count to be connected to the system while maintaining a handshake protocol for transactions between a master and the slaves in the system.

This and other needs are met by the present invention which provides a computer system comprising a central processing unit (CPU), a master coupled to the CPU, and a plurality of interface cards that interface the computer system with peripheral devices. A plurality of host adapters are coupled between the master and the interface cards. The host adapters adapt signals between the CPU and the interface cards. Each host adapter generates a ready signal that when asserted indicates readiness of the host adapter to receive address information from the bus master and have data information read by the master. An address/data bus is coupled between the master and the host adapters. A single separate ready line is coupled between each of the host adapters and the master, each ready line carrying the ready signal from a different one of the host adapters to the master.

The present invention uses a single ready signal carried by a single line to serve both the address ready and data ready signalling functions previously carried by two separate lines. This provides the advantage of reducing the pin count in a slave, such as a host adapter, since only a single ready signal output connection is needed.

The earlier stated needs are also met by another aspect of the present invention which provides a method of transferring information between a master and a slave, the method comprising producing a single ready signal at the slave that indicates readiness of the slave to receive address information and readiness of the slave to have data information read, sending the address information to the slave from the master to initiate a transfer when the ready signal indicates that the slave is ready to receive the address information, and subsequently reading the data information from the slave by the master when the ready signal indicates that the data information is ready to be read from the slave by the master.

The method of the present invention provides the advantages of a single ready signal serving as both an address ready signal and a data ready signal, and also allows split transactions to be performed, in which the data transfer follows some period of time after the address information has been sent. Split transactions are allowed since the data information will only be read by the master when the ready signal indicates that the data information is ready to be read. Prior to this indication, and following the sending of the address information, other transfers between the master and other slaves can be performed. When the ready signal indicates that the data information is to be read, the master will then read the data information to complete the split transaction. The ability to perform split transactions effectively increases the useable bandwidth of a bus coupling the master to a plurality of slaves, since the bus is freed for other transactions while the slave is retrieving the requested data.

The foregoing and other features, aspects and advantages of the present invention will become more apparent from the following detailed description of the present invention when taken in conjunction with the accompanying drawings.

BRIEF DESCRIPTION OF THE DRAWINGS

FIG. 5 is a timing diagram of a read hit operation performed according to the present invention.

FIG. 6 is an exemplary embodiment of an address phase encoding scheme according to the present invention.

DETAILED DESCRIPTION OF THE EMBODIMENTS

Figure 1:
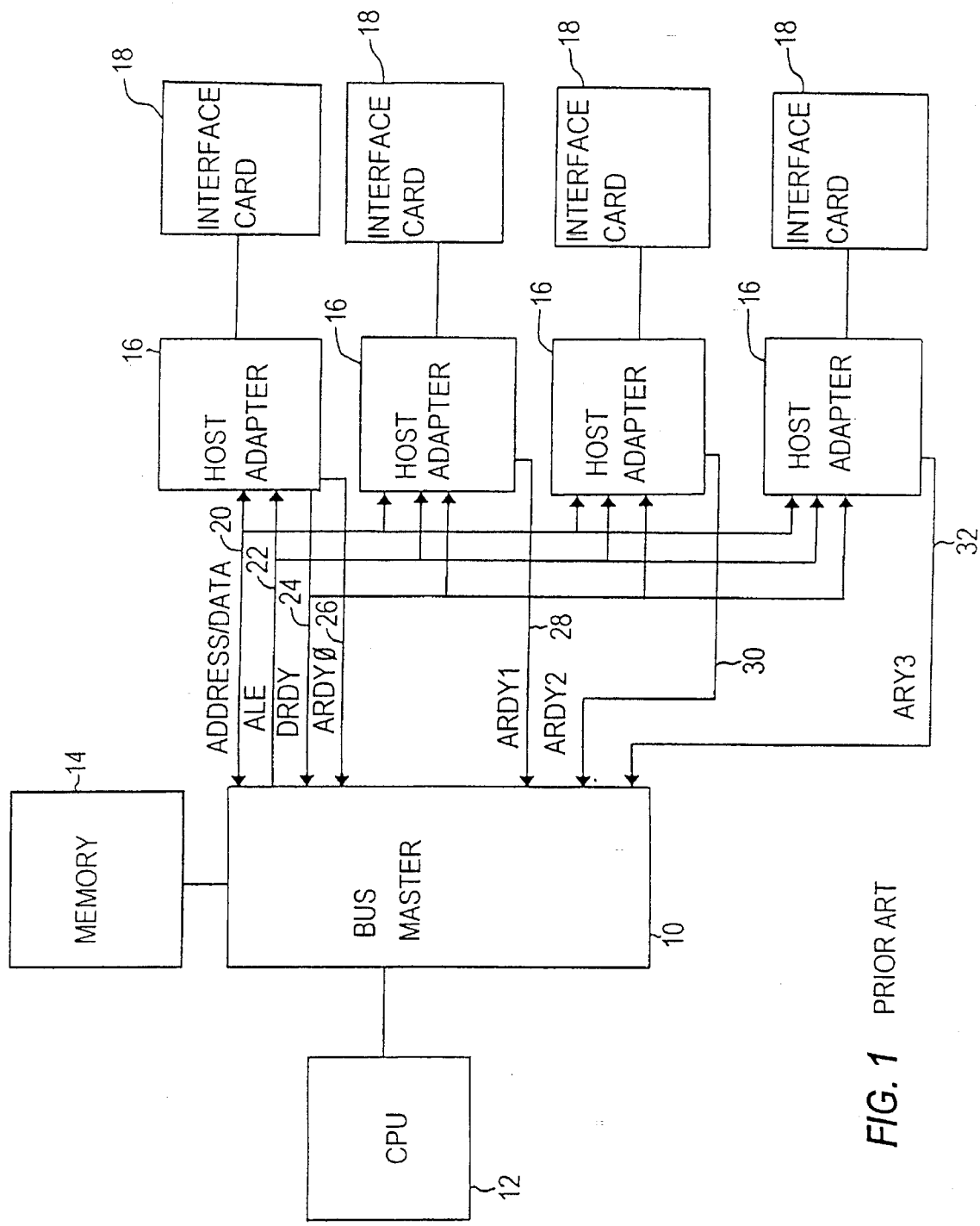
FIG. 1 is a block diagram of a prior art computer system.

FIG. 1 is a block diagram of a computer system constructed according to the prior art. The system has a bus master 10, coupled to a central processing unit (CPU) 12 and a memory 14. The bus master 10 is coupled to a plurality of slaves 16 by a bus 20. Addresses and data are time multiplexed on the bus 20, such that an address phase is followed by a data phase on the bus 20.

The slaves 16 are, for example, host adapters for interface cards 18. The host adapters 16 adapt the signals of the interface cards 18 to signals useable by the rest of the computer system, and vice versa. The interface cards 18 provide an interface to peripheral devices (not illustrated) that communicate with the computer system.

An example of an interface card 18 used in prior art systems is the personal computer memory card international association (PCMCIA) expansion card, currently the standard for laptop peripheral connections. The host adapters 16 in the system can therefore be PCMCIA host adapters, and adapt signals between the computer system and the PCMCIA interface cards 18.

In addition to the bus 20, each host adapter 16 is coupled to the bus master 10 by a common address latch enable line 22. This line 22 carries an address latch enable signal generated by the bus master 10 to signify the start of a transaction.

The host adapters 16 are coupled via a common data ready line 24 to a data ready input of the bus master 10. The data ready signal from the host adapter 16 informs the bus master 10 that a slave (the host adapter 16) has data ready for reading by the bus master 10. Only a common line is necessary, since the data phase of a transaction follows the address phase, so that the bus master 10 is already aware of the identity of the host adapter 16 that is sending the data (and the data ready signal).

In contrast to the common bus 20, the address latch enable line 22, and the data ready line 24, each host adapter 16 is coupled to the bus master 10 by a separate address ready line 26, 28, 30 or 32. Each address ready line 26–32 carries the host adapter's address ready signal that indicates the readiness of the individual host adapters 16 for receiving and responding to the assertion of an address by the bus master 10 over the bus 20. Since each address ready signal is a binary signal indicating ready or not-ready, a separate signal from each of the host adapters 16 is required so that the bus master 10 can identify which of the host adapters 16 are ready for the address phase of a transaction.

Every host adapter 16 in the prior art system has one output connection for its address ready signal, and another output connection for its data ready signal. As will become apparent from the description below, the present invention reduces the pin count by combining the address ready and data ready signals as a single signal serving both signalling functions, and a protocol that uses this single signal to effect handshaking between the master and the host adapters.

Figure 2:
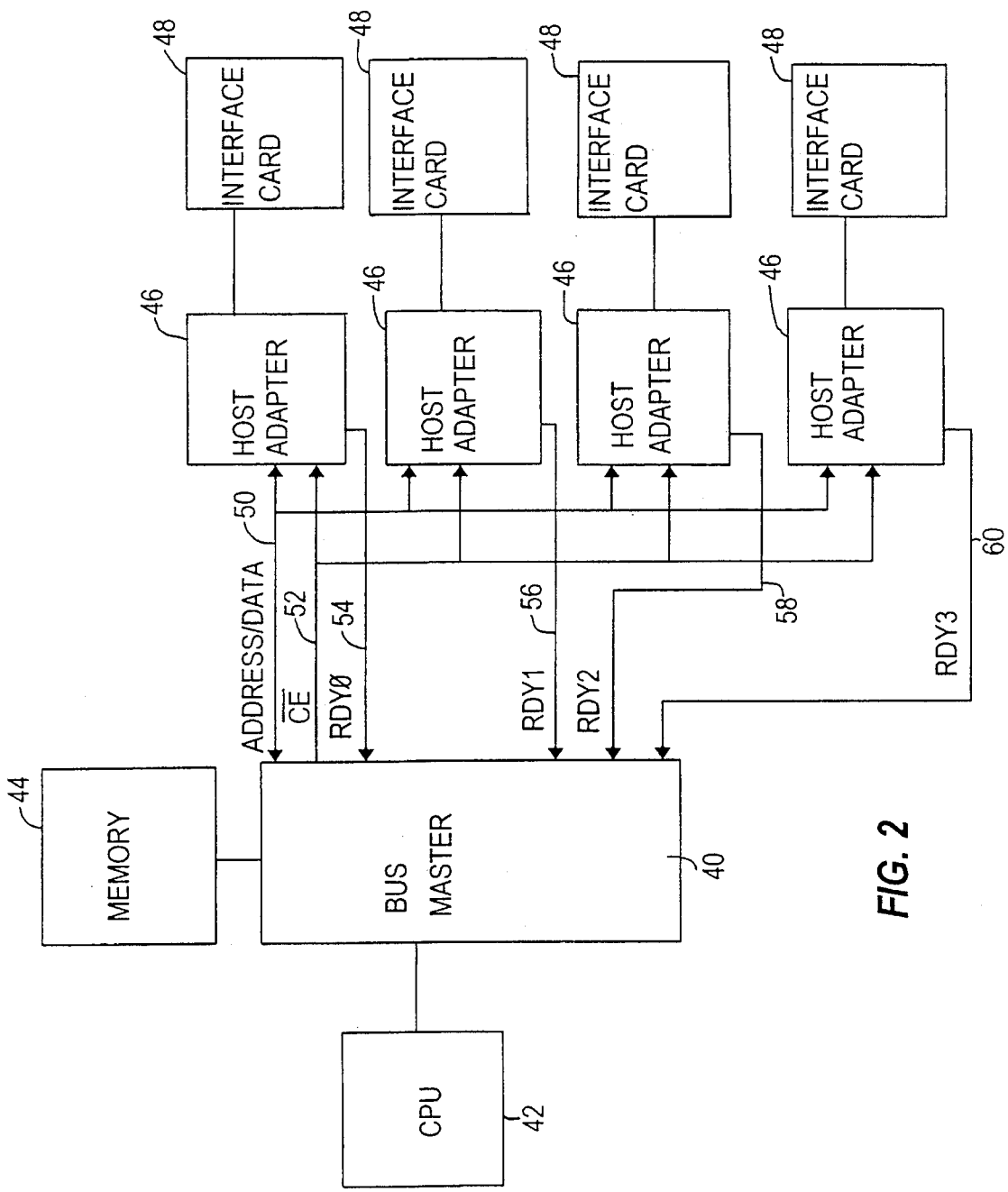
FIG. 2 is a block diagram of a computer system constructed in accordance with the prior art.

The block diagram of FIG. 2 is a depiction of a computer system constructed in accordance with an exemplary embodiment of the present invention. For purposes of explanation of a preferred embodiment, the host adapters and the interface cards will be described as PCMCIA adapters and PCMCIA cards, but it should be understood that the invention is generally applicable to other computer systems having different types of master and slave devices. Furthermore, the present invention is not limited to systems having CPU's and interface cards, but rather, is applicable to other systems and environments having masters and slaves.

The computer system of FIG. 2 has a bus master 40, a CPU 42 and a memory 44. The bus master is connected by a common bus 50 to a plurality of slaves 46, such as PCMCIA host adapters. Both address and data information are carried on this bus 50 in a time multiplexed manner. The bus can be a 16-bit wide bus, for example. A transaction between a master 40 and a slave 46 includes an address phase followed by a data phase.

A common chip enable line 52 additionally couples each of the host adapters 46 to a chip enable output of the bus master 40. The chip enable signal from the bus master 40 enables all of the host adapters 46 to perform a transaction.

Each host adapter 46 is coupled to the bus master 40 by a separate ready line 54, 56, 58 or 60. These lines 54–60 carry a ready signal from the individual host adapters 46 that indicates the readiness of the host adapters 46 to receive address information and to have data information read. The host adapters 46 of the present invention, therefore, only have one output connection for a ready signal, rather than the two (address and data) output connections of the prior art host adapters.

A total of four host adapters 46 are provided in the exemplary configuration of the computer system to support four interface cards. However, other embodiments of the present invention have different numbers of host adapters and interface cards, so that the invention is not limited to the exact configuration illustrated.

An interface card 48, such as a PCMCIA interface card, is connected to each host adapter 46 by a 62 bit connection, for example. In the present invention, each host adapter 46 performs its conventional function of adapting the signals between the computer system and one of the interface cards.

The operation and the protocol of the present invention will now be described using the timing diagrams of FIGS. 3–5. These timing diagrams represent the three different types of master/slave transactions carried out by the computer system.

Figure 3:
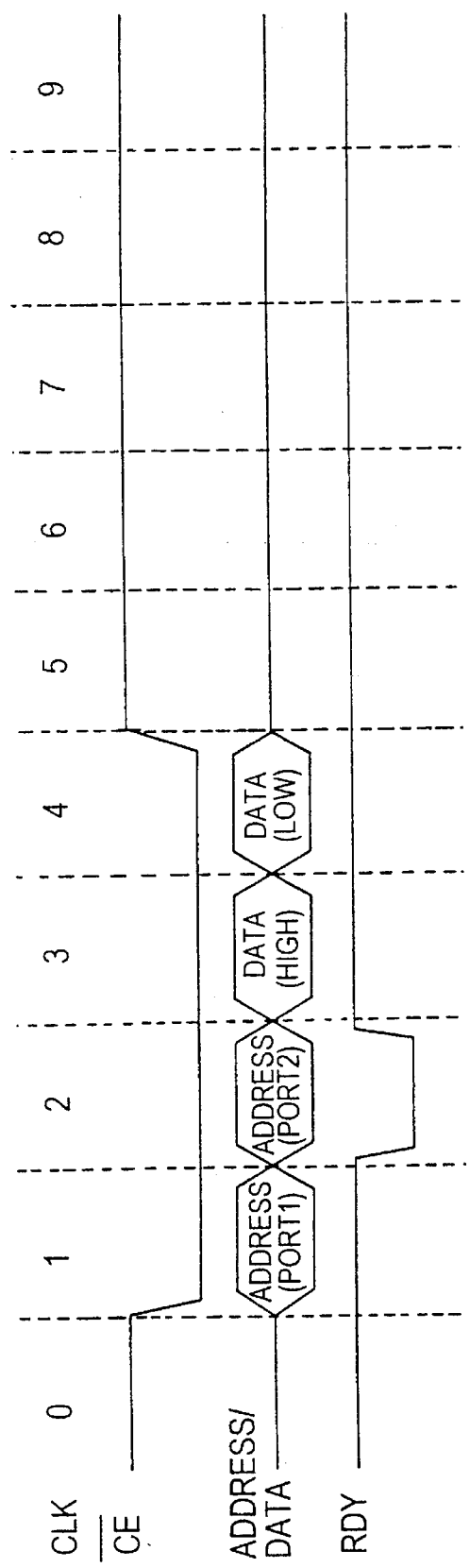
FIG. 3 is a timing diagram of a write operation performed according to the present invention.
Figure 4:
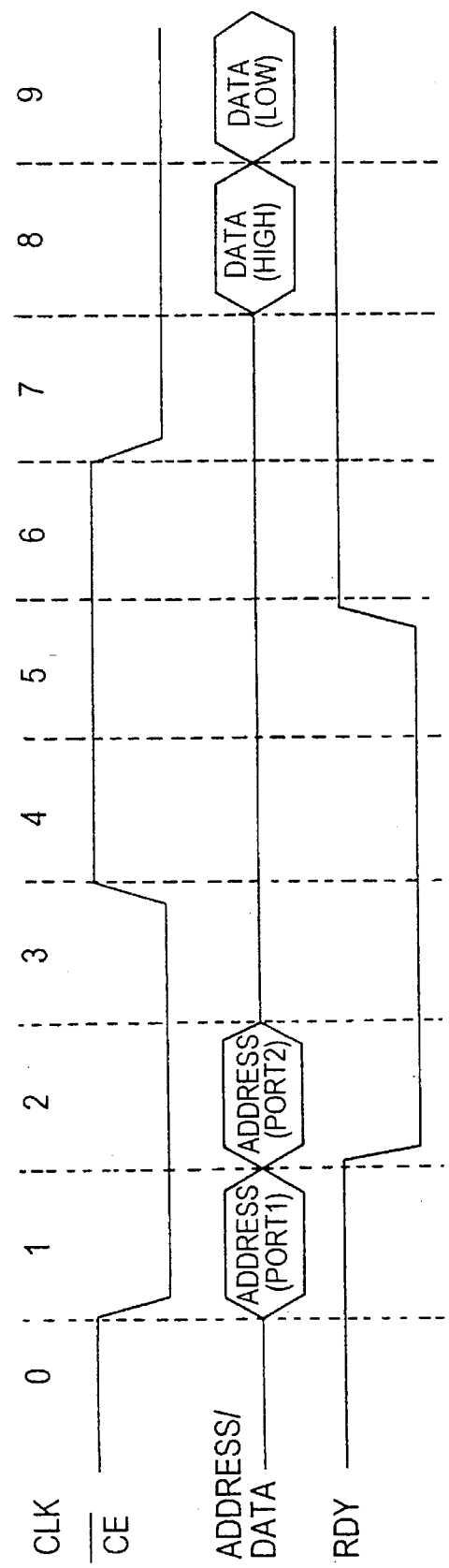
FIG. 4 is a timing diagram of a read miss operation performed according to the present invention.

FIG. 3 is a timing diagram of a "write" operation, in which the master 40 writes data to the slave (the host adapted 46). The host adapter 46 will adapt the address and data signals into signals that can be used by the interface card 48. In clock 0, the chip enable signal ($\overline{CE}$) is deasserted (high), so that none of the host adapters 46 are presently enabled. Each of the host adapters 46 sends its ready signal (RDY) to the bus master 40. Assume that the bus master 40 desires a transaction with a particular host adapter 46. This particular host adapter 46 which is to perform the transfer will henceforth be referred to as the transfer host adapter 46. After sampling the ready signal RDY at the bus master's ready signal input for the transfer host adapter, and assuming that the ready signal is asserted to indicate that the transfer host adapter 46 is ready to receive address information, the bus master 40 initiates the transaction by asserting the chip enable signal (low) in clock 1.

The bus master 40 asserts a first part of the address phase of the transfer in clock 1. Each of the host adapters 46, which have all been enabled by the assertion of the chip enable signal, decodes the first part of the address phase to determine if it is to participate in the transfer, in other words, whether it is to serve as the transfer host adapter 46 for this transfer. The first part of the address phase, as will be described in more detail with respect to FIG. 6, contains a host adapter identifier that identifies the transfer host adapter for the transaction.

In response to recognition of its host adapter identifier in clock 1, the transfer host adapter 46 pulses its individual ready signal as a confirmation to the bus master 40 that it has recognized that it is to be the transfer host adapter. The ready signal is reasserted by the transfer host adapter 46 in clock 3. The bus master 40 sends the second part of the address phase in clock 2. The chip enable signal remains asserted throughout the write operation.

The data phase immediately follows the address phase in write operations since the bus 50 does not have to be "turned around" (the data is sent in the same direction as the address), and the transfer host adapter 46 is assumed ready to receive the data. The data follows the address in two parts, in clocks 3 and 4. In this exemplary embodiment, the bus 50 is a 16-bit bus so that 2 bytes of data can be transferred in one clock. However, the data phase need not consist of two parts (in the illustrated example, 4 bytes), and other size transfers of data can be performed. For this purpose, the first part of the address phase contains information which informs the transfer host adapter 46 of the number of bytes that will be written.

The transfer host adapter 46 adapts the address information contained in the address phase, and the data information in the data phase, into signals useable by the interface card 48. In the exemplary embodiment, the data can be written to four different "spaces". A conventional PCMCIA interface card has three spaces: (1) a common space; (2) an input/output (I/O) space; and (3) an attribute memory space. Each of these spaces is defined to have a 64 Mbyte range addressable by twenty-six (26) bits. The fourth space that can be written to is defined as configuration registers located on the transfer host adapter 46. For writes to these registers, a portion of the 26 address bits are used to decode which register is being written to, and the remaining bits address the particular location in the selected register. The first part of the address phase contains the information that identifies which space is being written to.

After the data has been transferred, the bus master 40 deasserts the chip enable signal, ending the transfer. Another transfer is then able to be initiated.

A second type of transfer is a "read miss" transfer in which the data requested to be read by the master 40 does not currently reside in the transfer host adapter 46. For a large percentage of read requests, the data requested resides in a prefetch buffer of the transfer host adapter 46, which has prefetched the data from the interface card 48. Alternatively, the data may reside in a register of the transfer host adapter 46. However, when the data is not in the prefetch buffer or in one of the onboard registers of the transfer host adapter 46, the data must be retrieved from the interface card 48.

The present invention supports a split transaction protocol in which the bus is freed for use by other devices during the time that the data is being retrieved. The timing diagram of FIG. 4 illustrates an exemplary read miss transfer.

The bus master 40 asserts the chip enable signal and sends the first part of the address phase in clock 1. All of the host adapters 46 decode the address. One of the host adapters 46 will recognize the host adapter identifier signifying that it is to serve as the transfer host adapter 46. In clock 2, the transfer host adapter 46 pulses its ready signal low (deasserted) to confirm recognition of the host adapter identifier to the bus master 40. However, in this case, the data requested is not in either the prefetch buffer or a register of the transfer host adapter 46 and must be retrieved from the interface card 48. The transfer host adapter therefore maintains its' ready signal in a low, deasserted level.

At the end of clock 3, the ready signal for the transfer host adapter 46 is sampled by the bus master 40. This sampling is performed a defined time after the end of the address phase. In the illustrated embodiment, the defined time is one clock. If the sampling indicates that the ready signal is deasserted at the end of clock 3, the bus master 40 recognizes that there is a read miss and that the transfer host adapter 46 is retrieving the data. The bus master 40 then deasserts the chip enable signal in clock 4. This action frees the bus 50 for other transfers between the bus master 40 and other host adapters 46. The utilization of the bus 50 and therefore the efficiency of the system are improved by the freeing of the bus 50 for other transfers.

When the transfer host adapter 46 has retrieved the data from the interface card 48 and is ready for the data to be read by the bus master 40, the transfer host adapter 46 reasserts its ready signal (clock 6). The bus master 40, which has logic for sampling and resampling the ready signal, responds to the assertion of the ready signal of the transfer host adapter 46 by asserting the chip enable signal (clock 7). The transfer host adapter 46 recognizes the chip enable signal and provides the data to be read in clocks 8 and 9. The bus 50 is then freed for use for other transfers. It should be noted that the transfer host adapter 46 is not automatically granted the bus 50 when it is ready to return the requested data. It must first arbitrate for the bus 50, with the bus master 40 performing the arbitration. The transfer host adapter 46 will normally be granted the bus when there are no other transfers currently being performed.

A third type of transfer is a "read hit" transfer in which the requested data is in the prefetch buffer or the registers of the transfer host adapter 46. An exemplary timing diagram of a read hit transfer is provided in FIG. 5.

The read hit is similar to the read miss for the first two clocks. In clock 3, however, the transfer host adapter 46 reasserts its ready signal. This indicates to the bus master 40 that the requested data currently resides in the transfer host adapter 46. Clock 3 is used to "turn the bus around" so that data can be read by the bus master 40. During this clock, the bus 50 is in a high impedance state. After the defined time (for example, one clock) following the address phase, the ready signal of the transfer host adapter 46 is sampled by the sampling logic of the master 40. Since the sampled ready signal is asserted, the bus master 40 maintains the chip enable signal asserted. The data residing in the transfer host adapter 46 is then read in clocks 4 and 5. The master 40 deasserts the chip enable signal in clock 6 to allow other transfers to be initiated.

The exemplary embodiment of the bus 50 is a 16-bit bus, and the address phase is two parts, to provide 32 bits of information. An exemplary encoding of the address phase (parts 1 and 2) is illustrated in FIG. 6.

In the first part of the address phase, size bits (15:14) indicate the size of the requested transfer, from one to four bytes. Slot bits (13:12) form the host adapter identifier. Since two bits are used to form this identifier, the exemplary embodiment of the present invention will support up to four host adapters 46. Reconfiguration of the address phase encoding in other embodiments to enlarge or reduce the number of bits that form this identifier will allow more or less host adapters to be supported.

Space bits (11:10) indicate which space is being addressed. As explained earlier, an exemplary interface card, such as a PCMCIA card, has three spaces. These are: (1) common space; (2) I/O space; and (3) attribute memory space. These spaces are each defined to have a 64 Mbyte range, addressable by 26 bits. The space bits can also identify configuration registers on the transfer host adapter 46 as the space being addressed.

The remaining 10 bits (25:16) of the first part and the 16 bits (15:0) of the second part of the address phase are used to form the 26 bit address within the space identified by the space bits. When the configuration registers of the transfer host adapter 46 are identified by the space bits, some bits of the 26 bit address are use to decode which of the registers is being addressed, and the remainder are used to address within the specified register.

The present invention has been described using an exemplary embodiment that supports PCMCIA interface cards. However, the arrangement and protocol are applicable in general to computer systems having masters and slaves, and provides the advantages of reduced slave pin counts without sacrificing the performance of the bus.

Although the present invention has been described and illustrated in detail, it is clearly understood that the same is by way of illustration and example only and is not to be taken by way of limitation, the spirit and scope of the present being limited only by the terms of the appended claims.

We claim:

1. A computer system comprising:

a central processing unit (CPU);

a master coupled to the CPU;

a plurality of interface cards that interface the computer system with peripheral devices;

a plurality of host adapters coupled between the master and the interface cards, the host adapters adapting signals between the CPU and the interface cards, each host adapter generating a ready signal that when asserted indicates at least one of readiness of the host adapter to receive address information from the master and to have data information read by the master;

an address/data bus coupled between the master and the host adapters;

plurality of ready lines, each coupled between a corresponding one of the host adapters and the master, each ready line carrying the ready signal from the corresponding host adapter to the master.

2. The computer system of claim 1, further comprising a shared chip enable line coupled between the master and the host adapters, the master generating a chip enable signal that, when asserted, enables all of the host adapters for receiving address information and receiving or transferring data information.

3. The computer system of claim 2, wherein the master includes means for asserting the address information on the address/data bus to initiate a transfer with one of the host adapters, the address information containing a host adapter identifier that identifies a transfer host adapter, which is the host adapter with which the master is to perform the transfer.

4. The computer system of claim 3, wherein each host adapter includes means for recognizing the host adapter identifier, means for deasserting the ready signal after recognizing the host adapter identifier to indicate that the host adapter is not ready to have data information read by the master; and means for reasserting the ready signal when the host adapter is ready to have the data information read by the master.

5. The computer system of claim 4, wherein the master includes means for sampling the ready line of the transfer host adapter at a first defined time after the address information has been asserted, and means for deasserting the chip enable signal when the means for sampling determines that the ready signal of the transfer host adapter is deasserted.

6. The computer system of claim 5, wherein the master includes means for resampling the ready line of the transfer host adapter a second defined time after the chip enable signal is deasserted by the means for deasserting the chip enable signal.

7. The computer system of claim 6, wherein the master includes means for asserting the data information in a write operation directly after the address information on the address/data bus.

8. The computer system of claim 7, wherein the master includes means for reading in a read operation the data information from the transfer host adapter when the means for sampling or the means for resampling determines that the ready signal of the transfer host adapter is asserted and the chip enable signal is asserted.

9. The computer system of claim 8, wherein the first defined time is one cycle.

10. The computer system of claim 9, wherein each host adapter includes means for pulsing its ready signal in response to recognition of the host adapter identifier by the means for recognizing the host adapter identifier to confirm to the master that the host adapter has recognized the host adapter identifier.

11. The computer system of claim 10, wherein the interface card is a personal computer memory card international association (PCMCIA) card.

12. A host adapter for adapting signals between an input/output (I/O) device interface and a computer system, comprising:

means for adapting address and data signals between the I/O device interface and the computer system; and means for producing a single ready signal that indicates readiness of the host adapter to receive address information and to have data information read.

13. The host adapter of claim 12, further comprising means for recognizing a host adapter identifier that identifies a host adapter with which the computer system is to perform a transfer.

14. The host adapter of claim 13, further comprising means for deasserting the ready signal after recognizing the host adapter identifier to indicate that the host adapter is not ready to transmit data information from or to the bus master; and means for reasserting the ready signal when the host adapter is ready to have data information read by the bus master.

15. The host adapter of claim 13, further comprising means for pulsing its ready signal in response to recognition of the host adapter identifier by the means for recognizing the host adapter identifier to confirm that the host adapter has recognized the host adapter identifier.

16. The host adapter of claim 14, wherein the host adapter is a personal computer memory card international association (PCMCIA) adapter.

17. A method of transferring information between a master and a slave, the method comprising:

producing a single ready signal at the slave that indicates at least one of readiness of the slave to receive address information and readiness of the slave to have data information read; and sending the address information to the slave from the master to initiate a transfer when the ready signal indicates that the slave is ready to receive the address information; and subsequently reading the data information from the slave by the master when the ready signal indicates that data information is ready to be read from the slave by the master.

18. The method of claim 17, further comprising sampling the ready signal after a predefined time following the sending of the address information to ascertain whether the data information is ready to be read.

19. The method of claim 17, further comprising deasserting a chip enable signal when the sampling of the ready signal indicates that the data information is not ready to be read.

20. The method of claim 19, further comprising resampling the ready signal following the deassertion of the chip enable signal and reasserting the chip enable signal in response to the ready signal indicating that the data information is ready to be read from the slave by the master, the master subsequently reading the data information.

21. The method of claim 17, further comprising writing the data information to the slave from the master immediately following the sending of the address information to the slave.

22. The method of claim 17, further comprising decoding the address information by the slave to determine if the slave is to participate in the transfer.

23. The host adapter of claim 12, wherein the adapting means adapts said address and data signals between an address/data bus coupled to the computer system and the I/O device interface, the single ready signal indicating at least one of readiness of the host adapter to receive said address information from the address/data bus and readiness to have said data information read for transmission on the address/data bus.

24. The method of claim 17, wherein:

the sending step comprises sending the address information to the slave from the master via an address/data bus; and said reading step comprises the step of reading the data information from the slave by the master via the address/data bus.

* * * * *